(12) United States Patent
Quappen

(10) Patent No.: US 10,227,962 B2
(45) Date of Patent: Mar. 12, 2019

(54) WING AND TURBINE CONFIGURATION FOR POWER PLANT

(71) Applicant: MINESTO AB, Västra Frölunda (SE)

(72) Inventor: Arne Quappen, Göteborg (SE)

(73) Assignee: MINESTO AB, Västra Frölunda (SE)

( * ) Notice: Subject to any disclaimer, the term of this patent is extended or adjusted under 35 U.S.C. 154(b) by 487 days.

(21) Appl. No.: 14/904,361

(22) PCT Filed: Jul. 12, 2013

(86) PCT No.: PCT/SE2013/050893
§ 371 (c)(1),
(2) Date: Jan. 11, 2016

(87) PCT Pub. No.: WO2015/005836
PCT Pub. Date: Jan. 15, 2015

(65) Prior Publication Data
US 2016/0146181 A1    May 26, 2016

(51) Int. Cl.
*F03B 17/06* (2006.01)
*F03D 9/25* (2016.01)
(Continued)

(52) U.S. Cl.
CPC ............ *F03B 17/061* (2013.01); *B63G 8/001* (2013.01); *B63G 8/18* (2013.01); *F03B 13/264* (2013.01);
(Continued)

(58) Field of Classification Search
CPC ........ F03B 17/061; F03B 13/264; F03D 9/28; B63G 8/18; B63G 8/001; Y02E 10/38;
(Continued)

(56) References Cited

U.S. PATENT DOCUMENTS 3,250,238 A * 5/1966 Reder ..................... B63B 1/048
114/280
4,073,516 A    2/1978 Kling
(Continued)

FOREIGN PATENT DOCUMENTS

AU   2008202294 A1   12/2008
EP      1816345 A1    8/2007
(Continued)

OTHER PUBLICATIONS

Office Action received for Chilean Patent Application No. 201600062, dated Sep. 4, 2017, 9 pages (1 page of English translation and 8 pages of Official Copy).
(Continued)

*Primary Examiner* — Dwayne J White
*Assistant Examiner* — Adam W Brown
(74) *Attorney, Agent, or Firm* — Morrison & Foerster LLP

(57) ABSTRACT

A power plant includes a structure and a vehicle having at least one wing including a first wing part and a second wing part. The vehicle is arranged to be secured to the structure by at least one tether. The vehicle is arranged to move in a predetermined trajectory by a fluid stream passing the wing. The vehicle includes at least one turbine connected to a nacelle having a generator. At least the first wing part is arranged at a first angle relative to a horizontal center line of the wing. The nacelle is arranged to be attached to a surface of the wing facing the direction in which the first wing part is angled.

9 Claims, 3 Drawing Sheets

(51) Int. Cl.
*F03D 9/32* (2016.01)
*B63G 8/00* (2006.01)
*B63G 8/18* (2006.01)
*F03B 13/26* (2006.01)
*F03D 9/28* (2016.01)

(52) U.S. Cl.
CPC ............... *F03D 9/257* (2017.02); *F03D 9/28* (2016.05); *F03D 9/32* (2016.05); *F05B 2240/917* (2013.01); *F05B 2240/921* (2013.01); *Y02E 10/28* (2013.01); *Y02E 10/38* (2013.01); *Y02E 10/726* (2013.01); *Y02E 10/728* (2013.01)

(58) Field of Classification Search
CPC ..... Y02E 10/728; Y02E 10/726; Y02E 10/28; F05B 2240/921; F05B 2240/917
See application file for complete search history.

(56) References Cited

U.S. PATENT DOCUMENTS

| | | | |
|---|---|---|---|
| 6,091,161 A | | 7/2000 | Dehlsen et al. |
| 6,923,622 B1 | | 8/2005 | Dehlsen |
| 7,291,936 B1 * | 11/2007 | Robson | ................ F03B 13/264 290/43 |
| 8,127,704 B2 * | 3/2012 | Vosburgh | ................ B63G 8/42 114/245 |
| 2002/0158472 A1 | 10/2002 | Robson | |
| 2008/0018115 A1 * | 1/2008 | Orlov | ................ F03B 17/061 290/54 |
| 2010/0013226 A1 | 1/2010 | Blumer et al. | |
| 2010/0327583 A1 * | 12/2010 | Hunt | ................ B63B 21/50 290/43 |
| 2011/0095530 A1 * | 4/2011 | Blumer | ................ F03B 17/061 290/43 |
| 2012/0319407 A1 | 12/2012 | Glass et al. | |
| 2013/0104538 A1 * | 5/2013 | Yuck | ................ F03B 13/182 60/506 |

FOREIGN PATENT DOCUMENTS

| | | |
|---|---|---|
| EP | 2439402 A1 | 4/2012 |
| ES | 2372513 B1 | 12/2012 |
| FR | 2962497 A1 | 1/2012 |
| JP | 2002-535188 A | 10/2002 |
| NO | 328410 B1 | 2/2010 |
| WO | 2009/157778 A2 | 12/2009 |

OTHER PUBLICATIONS

International Written Opinion received for PCT Patent Application No. PCT/SE2013/050893, dated Apr. 4, 2014, 6 pages.
Office Action received for Japanese Patent Application No. 2016-525324, dated Jun. 26, 2017, 6 pages (3 Pages of English Translation and 3 pages of Official Copy).
International Preliminary Report on Patentability received for PCT Patent Application No. PCT/SE/2013/050893, dated Sep. 21, 2015, 9 pages.
International Search Report received for PCT Application No. PCT/SE/2013/050893, dated Apr. 4, 2014, 4 pages.

* cited by examiner

WING AND TURBINE CONFIGURATION FOR POWER PLANT

CROSS REFERENCE TO RELATED APPLICATIONS

This application is a U.S. National Stage patent application of PCT/SE2014/050893, filed on Jul. 12, 2013, the entire contents of which are incorporated herein by reference.

FIELD OF THE INVENTION

The invention relates to a power plant for producing electrical power. The power plant comprises a structure and a vehicle comprising at least one wing comprising a first wing part and a second wing part. The vehicle is arranged to be secured to the structure by means of at least one tether. The vehicle is arranged to move in a predetermined trajectory by means of a fluid stream passing the wing. The vehicle comprises at least one turbine connected to a nacelle comprising a generator.

BACKGROUND OF THE INVENTION

Power plants for generating electrical power are known in the art, see for instance EP 1816345. In EP 1816345 the power plant comprises a vehicle attached to a structure moving along a trajectory being powered by tidal currents.

A problem which may arise from the power plant described in EP 1816345 is that the vehicle has a tendency to tilt upwards leading to a less than optimal trajectory. This is caused by an uneven distribution of mass over the vehicle's volume causing the centre of buoyancy and the centre of gravity to not be in the same place. If there is a large distance between the centre of gravity and the centre of buoyancy a torque resulting in the difference between the buoyancy force and the gravitational force will tilt the vehicle upwards. This is a problem particularly in low velocity currents where the hydrodynamic lift of the wing of the vehicle is of the same order of magnitude as or lower than the resulting lift force due to buoyancy and the gravitational force.

It is therefore desirable to provide an improved power plant.

SUMMARY OF THE INVENTION

One object of the present invention is to provide an inventive power plant where the previously mentioned problems are partly avoided. This object is achieved by the features described below.

The invention relates to a power plant for producing electrical power. The power plant comprises a structure and a vehicle comprising at least one wing comprising a first wing part and a second wing part. The vehicle is arranged to be secured to the structure by means of at least one tether. The vehicle is arranged to move in a predetermined trajectory by means of a fluid stream passing the wing. The vehicle comprises a nacelle comprising a generator, where the nacelle is attached to a turbine. At least the first wing part is arranged at a first angle relative a horizontal centre line of the wing. The nacelle is arranged to be attached to a surface of the wing facing the direction in which the first wing part is angled.

A submersible power plant may use front and rear struts to give the tether an attachment point far below the wing. The struts reduce pitch instability and the influence of hydrostatic unbalance by changing the weight distribution of the vehicle. This is a however a system involving several relatively fragile parts and a number of couplings and is therefore complex to design and manufacture which may increase the cost of the submersible plant. An advantage with the invention is that by having at least a first wing part arranged at a first angle relative a horizontal centre line of the wing and a nacelle attached to a surface of the wing facing the direction in which the first wing part and the second wing part are angled, structural components such as struts are no longer necessary in order to achieve a desired structural strength and control stability of the vehicle of the power plant. These features allows for a more compact build of the vehicle which makes handling of the vehicle along the predetermined trajectory easier. The fact that at least one wing part is arranged at an angle relative a horizontal centre line of the wing ensures that stability can be achieved even without the struts. Further, by removing the struts, less drag is experienced by the power plant as the vehicle moves along the predetermined trajectory. Another advantage of removing the struts is that the compact build of the power plant simplifies transport and handling during installation and maintenance.

Further, the more compact build of the vehicle allows for a reduction of the distance between the centre of gravity and the centre of buoyancy of the vehicle thereby reducing or removing the adverse effects found in prior art described above.

The second wing part may be arranged at a second angle relative a horizontal centre line of the wing. The nacelle may be attached to a surface of the wing facing the direction in which the first wing part and the second wing part are angled.

The first wing part and the second wing part may both be arranged at angles relative a horizontal centre line of the wing. This allows for the possibility of the vehicle to be built in many different configurations depending on desired handling properties and/or the conditions of the installation site.

The nacelle may be attached to the surface of the wing by means of a pylon, and one or more of the following characteristics may be chosen such that a centre of gravity of the vehicle and a centre of buoyancy of the vehicle essentially correspond:
the first angle and the second angle
a height of the pylon,
a weight of the nacelle
a thickness of the wing
a weight of the wing
a placement of a coupling between the tether and the vehicle
a weight of a coupling between the tether and the vehicle.

By designing the vehicle such that the centre of gravity and the centre of buoyancy essentially corresponds the problem of the vehicle tilting in low velocities is to a great extent reduced or even removed. By having the centre of gravity and the centre of buoyancy essentially correspond there is less torque exerted around the centre of gravity which reduces the tendency of the vehicle to tilt upwards.

The angles of the first wing part and the second wing part may be dihedral angles. The tether may be attached to the vehicle by being attached to a coupling on or on the inside of the wing of the vehicle.

By having the first and second wing parts angles be dihedral angles the vehicle will be stabilized due to the dihedral effect. This removes the need for structural components such as struts in order to stabilize the vehicle. In this configuration the nacelle is attached to an upper side of the wing of the vehicle as the wing are angled upwards. The tether can then be attached to the vehicle by being attached to a coupling in the wing of the vehicle such that no forces from the tether are lead through the nacelle.

By moving the nacelle above the wing the distance between the nacelle, and thereby the turbine and generator, and the structure is increased. This leads to that the velocity of the fluid flowing through the turbine is increased due to the increase in angular velocity of the nacelle while the wing moves with the same velocity. In this configuration the distance between the vehicle's centre of gravity and centre of buoyancy is reduced due to that the nacelle is placed in between the wing parts. It is thus easier to control the location of the centre of buoyancy and the centre of gravity by selecting suitable characteristics as mentioned above.

The first angle may be different from the second angle. The tether may be attached to the vehicle at a point separate from a middle point of the first wing part and the second wing part.

The vehicle is designed to move in a predetermined trajectory. If the vehicle is to move in a predetermined trajectory which is in the shape of a circle or oval, designing the vehicle with different angles for the first wing part and the second wing part may cause the vehicle to be biased to turn in one direction. This means that the vehicle will strive to move along the predetermined trajectory with less steering of the vehicle than otherwise necessary. It is in this case possible to select the placement of the tether in order to balance the effect from the angled wings such that desired bias can be achieved.

The angles of the first wing part and the second wing part may be anhedral angles. The tether may be attached to the vehicle by being attached to a coupling in an enclosure of the nacelle.

As an alternative to dihedral angles, anhedral angles may be used. In this configuration the nacelle is attached to a lower side of the wing of the vehicle as the wings are angled downwards. The tether can then be attached to the vehicle by being attached to a coupling in an enclosure of the nacelle.

In the same way as for the dihedral angles, anhedral angles can be used to improve stability and manoeuvrability of the vehicle. By having the nacelle mounted below the wing the centre of gravity is lowered thus leading to the same dihedral effect as when dihedral angles together with a nacelle mounted on a top surface of the wing are used.

The first angle may be between 5° and 20° relative a horizontal centre line of the wing, preferably between 10° and 15° relative a horizontal centre line of the wing when the first angle is a dihedral angle and wherein the first angle may be between −5° and −20° relative a horizontal centre line of the wing, preferably between −10° and −15° relative a horizontal centre line of the wing when the first angle is an anhedral angle. The second angle may be between 5° and 20° relative a horizontal centre line of the wing, preferably between 10° and 15° relative a horizontal centre line of the wing when the second angle is a dihedral angle and wherein the second angle may be between −5° and −20° relative a horizontal centre line of the wing, preferably between −10° and −15° relative a horizontal centre line of the wing when the second angle is an anhedral angle. A positive angle means that the wing parts are angled upwards, i.e. in a dihedral angle. A negative angle means that the wing parts are angled downwards, i.e. in an anhedral angle.

It is of course conceivable that the first wing part could be angled upwards and that the second wing part could be angled downwards or vice versa. A vehicle according to the invention may also have a wing which is polyhedral, i.e. where the first wing part and second wing parts are arranged at different angles along the length of the wing relative a horizontal centre line of the wing.

The wing sweep of the wing planform configuration may be one of a straight wing, swept wing or a forward swept wing. The wing chord of the wing planform configuration may be one of an elliptical chord, constant chord, tapered chord or trapezoidal chord.

By changing the wing planform the dihedral effect can be adjusted to have desired properties. The wing planform can also be used to control the centre of gravity and centre of buoyancy.

The vehicle may comprise a control arrangement, the arrangement being one of a V-tail, inverted V-tail, a movable tether connection or elevators.

The vehicle is steered along the predetermined trajectory in order to increase the power production. This is described in EP 1816345 wherein control surfaces of a prior art vehicle are described. In order to control the vehicle of the invention a control arrangement is necessary. A V-tail, a movable tether connection in which the tether has a movable coupling allowing pitch control, or elevators are three conceivable possibilities to control the pitch of the vehicle. The V-tail, combining the functions of elevators and a rudder, reduces the need for a rudder in order to control the yaw of the vehicle. A movable tether connection or elevators each requires a rudder to be able to control both pitch and yaw of the vehicle. The rudder is in this case placed on the nacelle while the elevators can be placed on the wing and/or on the nacelle.

The first wing part and/or the second wing part may comprise a wingtip device. The wingtip device is designed to reduce the drag of the vehicle. The wingtip device can be any one of for instance squared-off wingtips, aluminium tube bow wingtips, rounded wingtips, Hoerner style wingtips, winglets, drooped tips, raked wingtips, fences or end plates.

The power plant may be a submersible power plant. The power plant can be operated when submerged for instance in an ocean or in a lake. The fluid stream is in this case a stream of water, for instance tidal stream, ocean currents or lake currents.

DETAILED DESCRIPTION OF THE INVENTION

Figure 1:
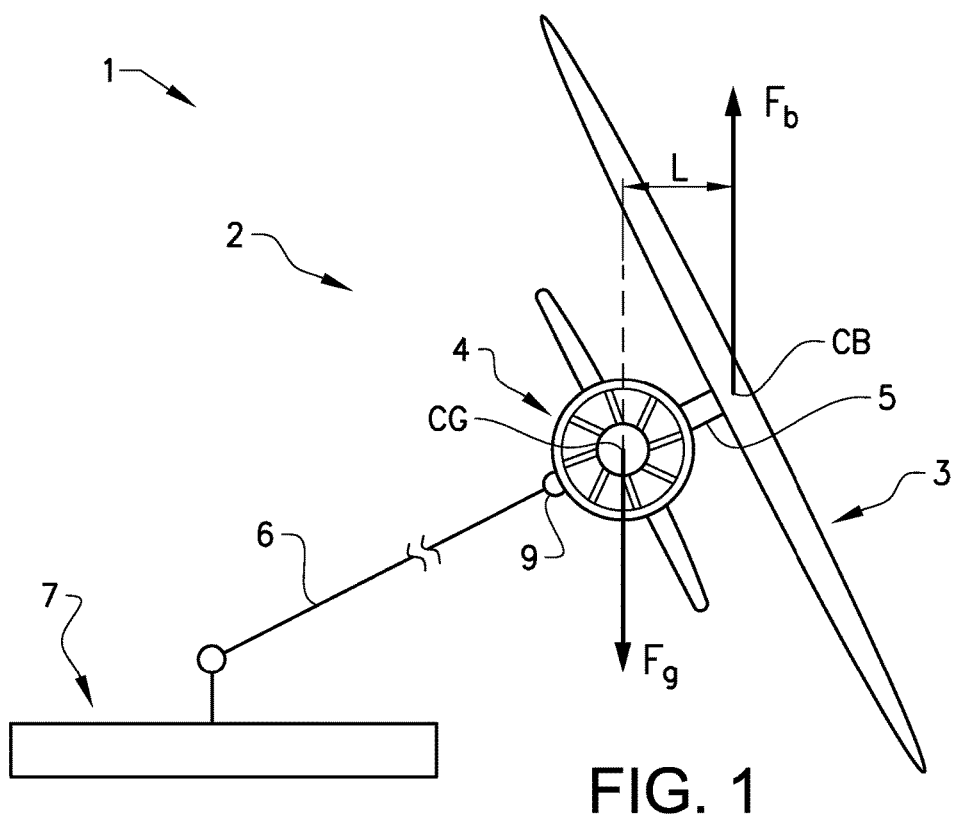
FIG. 1 schematically shows a prior art power plant,
FIG. 2 schematically shows a prior art power plant,
FIG. 3 schematically shows a perspective view of a power plant according to the invention,
FIG. 4 schematically shows a front view of a vehicle of a power plant according to the invention,
FIG. 5 schematically shows a front view of a vehicle of a power plant according to the invention.

FIG. 1 schematically shows a prior art power plant 1 comprising a prior art vehicle 2. The prior art vehicle 2 comprises a wing 3 and a nacelle 4 comprising a generator. The nacelle 4 is attached to a turbine. The nacelle 4 is attached to the wing 3 by means of a pylon 5 attached to an underside of the wing 3. A tether 6 attaches the prior art vehicle 2 to a structure 7. The prior art vehicle 2 comprises a centre of gravity (CG) and a centre of buoyancy (CB). In the prior art vehicle 2 the CG is located near the nacelle 4 and the CB is located near the wing 3. The placements of the GG and CB are merely illustrative in order to demonstrate a disadvantage of the prior art vehicle 2. A downward gravitational force Fg is exerted on the prior art vehicle 2 from the CG. A buoyancy force Fb is exerted on the prior art vehicle 2 from the CB. The prior art vehicle is designed to have the possibility to adjust the overall buoyancy to be neutral in the surrounding fluid. The uneven distribution of mass over the vehicle's displacement creates a vertical upward pointing buoyancy force Fb of about the same value as the vertical downward pointing gravitational force Fg giving rise to a resulting moment. The magnitude of the resulting moment depends on the distance between the force vectors Fb and Fg in a horizontal direction. The horizontal distance L between the CG and the CB gives rise to a lever-arm 8 resulting in that a torque is exerted around an attachment point 9 where the tether 6 is attached to the nacelle 4. The result of the torque exerted around the attachment point 9 where the tether 6 is attached to the nacelle 4 is shown in FIG. 2.

Figure 2:
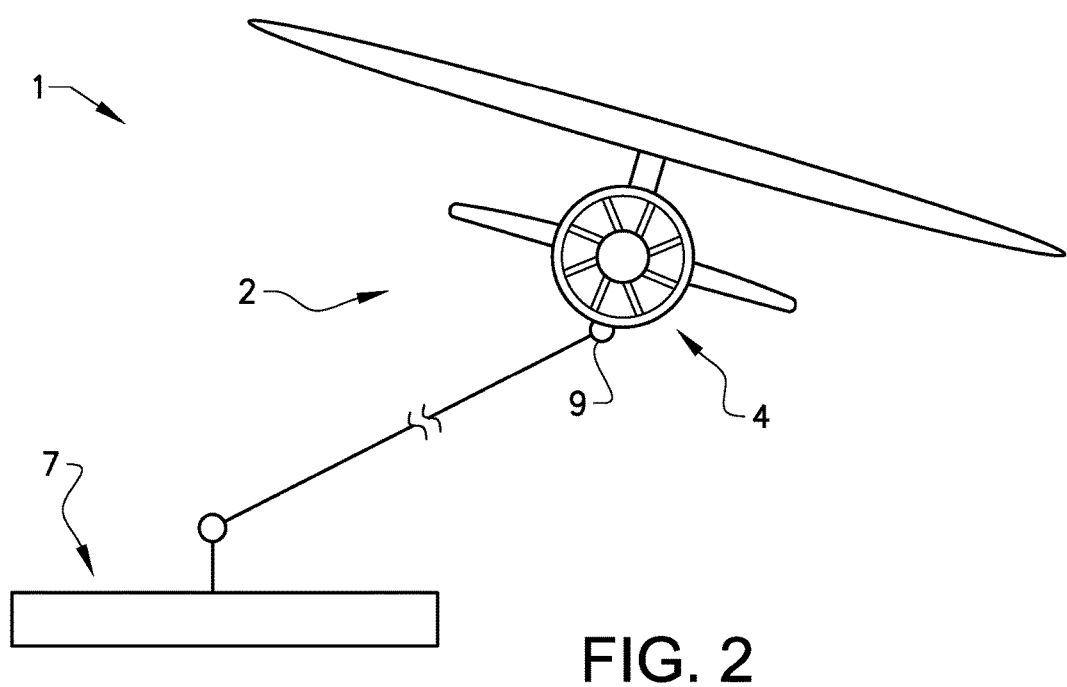

FIG. 2 schematically shows a prior art vehicle 2 of a prior art power plant 1. In FIG. 2 it can be seen that the prior art vehicle 2 has turned around the attachment point 9 where the tether 6 is attached to the nacelle 4 or alternatively to another structural feature such as struts. This gives rise to that the prior art vehicle 2 is in a position which is not optimal for power production. It may not always be possible to correct the position of the prior art vehicle 2 back to the position of FIG. 1 leading to that the prior art power plant 1 produces less than an optimal amount of power.

Figure 3:
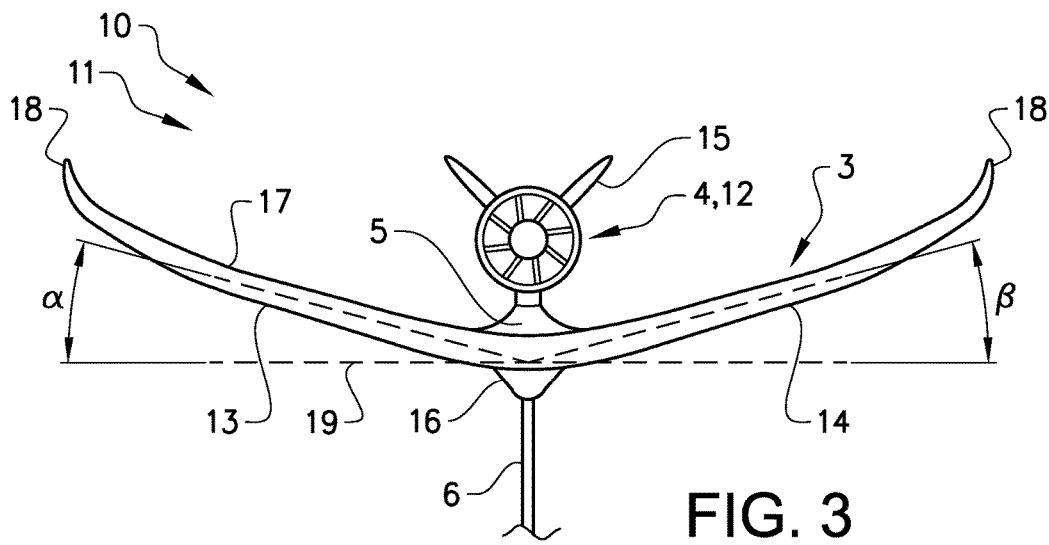

FIG. 3 schematically shows a front view of a vehicle 11 of a power plant 10 according to the invention. The vehicle 11 comprises a wing 3 and a nacelle 4 connected to a turbine 12. The wing 3 comprises a first wing part 13 and a second wing part 14. The nacelle 4 comprises a generator for producing electrical energy from the rotation of the turbine. The rotation of the turbine 12 from the flow of fluid through the turbine 12 rotates the generator in the nacelle 4 resulting in power generation. The nacelle 4 further comprises a control arrangement 15 in the shape of a V-tail for control and steering of the vehicle. The control surface of the V-tail can be the entire V-tail or only a part of the V-tail. The vehicle 11 is attached to a structure (not shown) by means of a tether 6. The tether 6 is attached to the wing 3 by means of a coupling 16 on the wing or on the inside of the wing 3. The coupling 16 is in FIG. 3 attached to a middle point of the wing, i.e. a point located between the first wing part 13 and the second wing part 14.

As can be seen from FIG. 3 the first wing part 13 and the second wing part 14 are angled upwards in a dihedral angle. The nacelle 4 is mounted on a top surface 17 of the wing 3, i.e. on the surface of the wing facing the direction in which the first wing part 13 and the second wing part 14 are angled. The nacelle 4 is mounted to the wing 3 by means of a pylon 5. The first wing part 13 and second wing part 14 further comprises wingtip devices 18.

The fact that the nacelle 4 is mounted on a top surface 17 of the wing 3, i.e. on the side of the wing towards which the first wing part 13 and the second wing part 14 are angled gives rise to that the effect seen in FIGS. 1 and 2 are greatly reduced. This is due to that the distance between the CG and the CB is reduced and the mass distribution is more even than in the prior art example. The distance between the CG and the CB can be controlled by a combination of factors where the planform configuration of the wing 3 is one of many factors. Other factors can be the height of the pylon, the weight of the nacelle, the thickness and weight of the wing and/or the placement, design and weight of the coupling between the tether and the vehicle.

In FIG. 3 an imaginary horizontal centre line 19 is shown relative which a first angle α of the first wing part 13 and a second angle β of the second wing part 14 is measured. The first wing part 13 and second wing part 14 further comprises wingtip devices 18.

Figure 4:
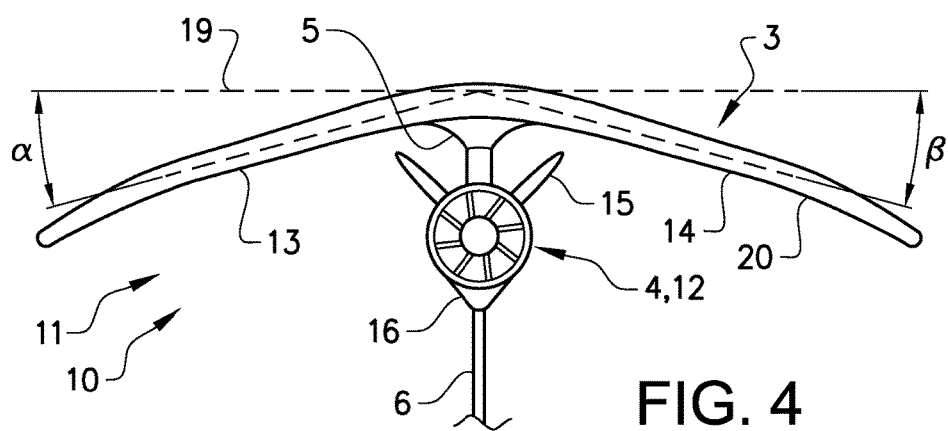

FIG. 4 schematically shows a front view of a vehicle 11 of power plant 10 according to the invention. In FIG. 4 an imaginary horizontal centre line 19 is shown relative which the first angle α of the first wing part 13 and the second angle β of the second wing part 14 is measured. In FIG. 4 the first wing part 13 and the second wing part 14 of the vehicle 11 of the power plant 10 are angled downwards in an anhedral angle. The nacelle 4 is mounted on a bottom surface 20 of the wing 3, i.e. on the surface of the wing facing the direction in which the first wing part 13 and the second wing part 14 are angled. By mounting the nacelle 4 below the wing 3 the same effect as when the first wing part 13 and second wing part 14 exhibit a dihedral angle can be achieved. This is due to that the placement of the wing 3 above the nacelle 4 leads to that the wing is placed above the vehicle's centre of gravity leading to that the distance between the CG and the CB is reduced and the mass distribution is more even than in the prior art example.

The thickness of the wing 3 is measured from the top surface 17 to the bottom surface 20.

The wing 3 in FIGS. 3 and 4 is polyhedral. As mentioned above this is just one example of a wing 3 according to the invention.

Figure 5:
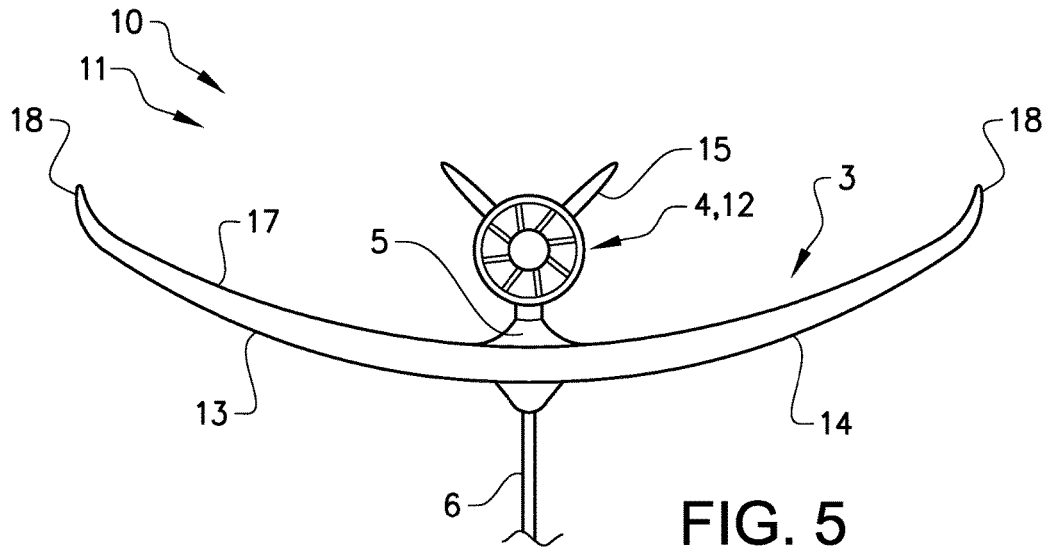

FIG. 5 schematically shows a front view of a vehicle 11 of a power plant 10 according to the invention. In FIG. 5 the first wing part 13 and the second wing part 14 are continuously curved upwards in a dihedral angle. The turbine is attached to a top surface of the wing. It is also possible for the continuously curved wing to be curved downwards in an anhedral angle with the turbine attached to a bottom surface of the wing.

Figure 6:
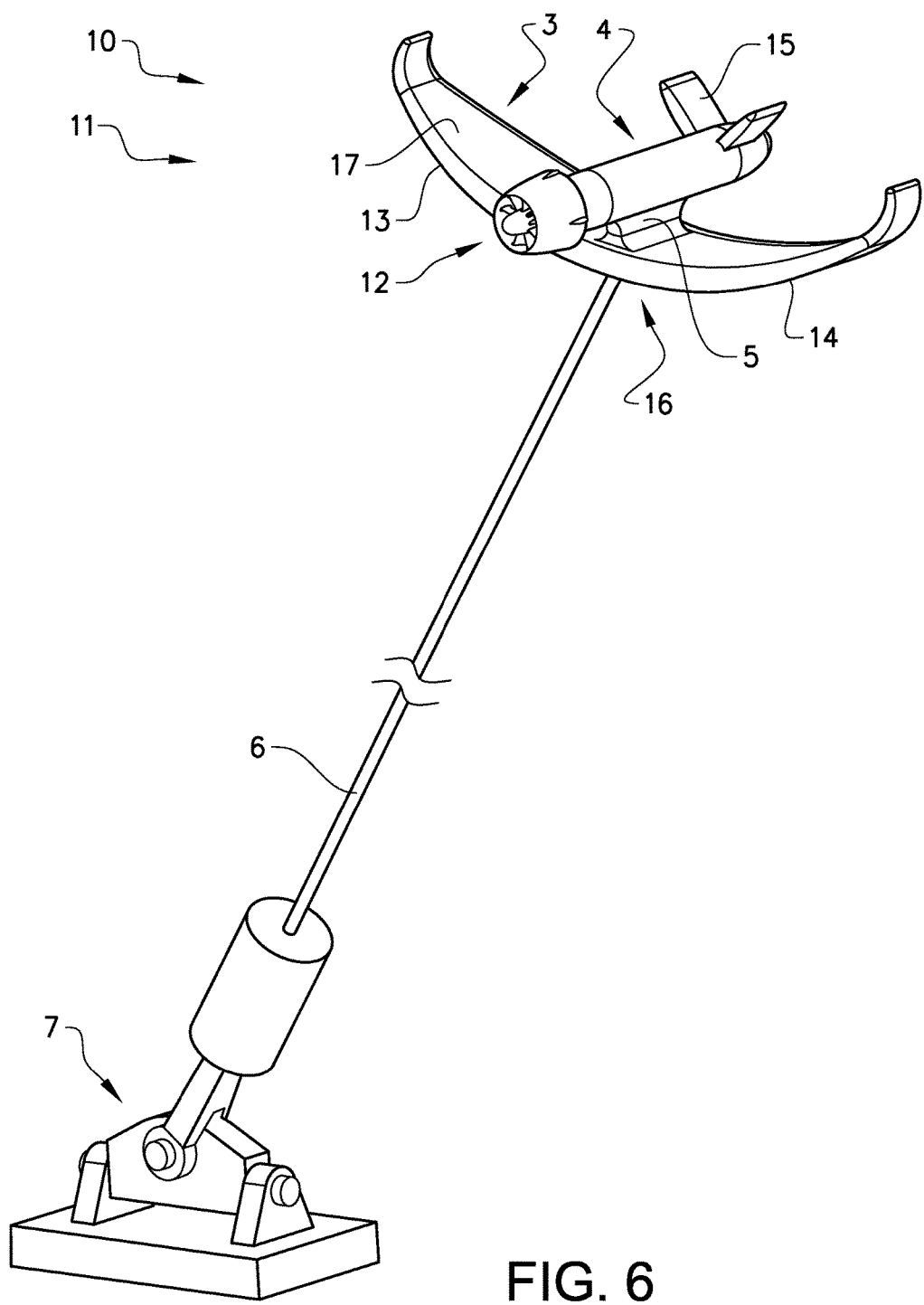
FIG. 6 schematically shows a front view of a vehicle of a power plant according to the invention.

FIG. 6 schematically shows a perspective view of a power plant 10 according to the invention. The power plant 10 comprises a vehicle 11 comprising a wing 3 and a nacelle 4 connected to a turbine 12. The vehicle 11 is attached to a structure 7 by means of a tether 6 and is arranged to move in a predetermined trajectory by means of that a fluid stream passes the wing 3. The electrical power produced by the generator is transferred from the vehicle 11 through the tether 6 to the structure 7. From the structure 7 the electrical power can be distributed to various locations through a power grid connected to the structure 7 of the power plant 10.

Reference signs mentioned in the claims should not be seen as limiting the extent of the matter protected by the claims, and their sole function is to make the claims easier to understand.

As will be realised, the invention is capable of modification in various obvious respects, all without departing from the scope of the appended claims. Accordingly, the drawings and the description thereto are to be regarded as illustrative in nature, and not restrictive.

The invention claimed is:

1. A submersible power plant for producing electrical power, the power plant comprising:
   a structure; and
   a vehicle comprising a wing comprising a first wing part and a second wing part, the vehicle being arranged to be secured to the structure by at least one tether; the vehicle being arranged to move in a predetermined trajectory by a fluid stream passing the wing, the vehicle comprising a nacelle comprising a generator, the nacelle being attached to a turbine, wherein the first wing part is arranged at a first angle relative to a horizontal centre line of the wing and the second wing part is arranged at a second angle relative to the horizontal centre line of the wing, wherein the first angle of the first wing part and the second angle of the second wing part are dihedral angles, and wherein the nacelle is attached to a surface of the wing facing the direction in which the first wing part and the second wing part are angled.

2. The submersible power plant of claim 1, wherein the nacelle is attached to the surface of the wing by a pylon, and where one or more of the following factors are chosen such that a centre of gravity of the vehicle and a centre of buoyancy of the vehicle essentially correspond:

the first angle and the second angle,
a height of the pylon,
a weight of the nacelle,
a thickness of the wing,
a weight of the wing,
a placement of a coupling attaching the tether and the vehicle,
a weight of a coupling attaching the tether and the vehicle.

3. The submersible power plant of claim 2, wherein the first angle is different from the second angle and the coupling attaching the tether to the vehicle is attached to a point separate from a middle point of the first wing part and the second wing part.

4. The submersible power plant of claim 1, wherein coupling attaching the tether to the vehicle is placed on the wing or on the inside of the wing of the vehicle.

5. The submersible power plant of claim 1, wherein the first angle is between 5° and 20° relative to the horizontal centre line of the wing.

6. The submersible power plant of claim 5, wherein the first angle is between 10° and 15° relative to the horizontal centre line of the wing.

7. The submersible power plant of claim 1, wherein the second angle is between 5° and 20° relative to the horizontal centre line of the wing.

8. The submersible power plant of claim 7, wherein the second angle is between 10° and 15° relative to the horizontal centre line of the wing.

9. The submersible power plant of claim 1, wherein the wing sweep of the wing planform configuration is one of a straight wing, swept wing or forward swept wing.

* * * * *